July 16, 1935.     J. J. SMITH     2,008,519
HARMONIC SUPPRESSION MEANS FOR SPACE DISCHARGE APPARATUS CIRCUITS
Filed Oct. 12, 1932
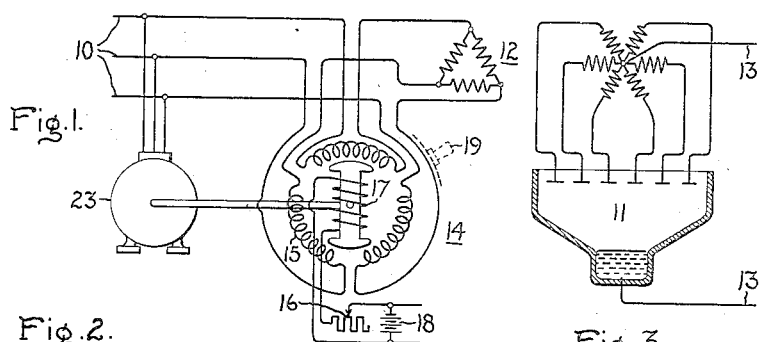
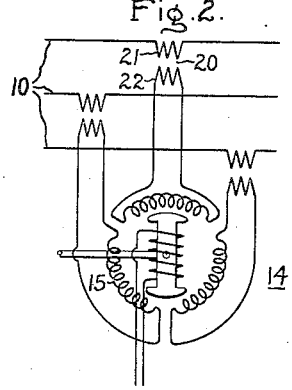
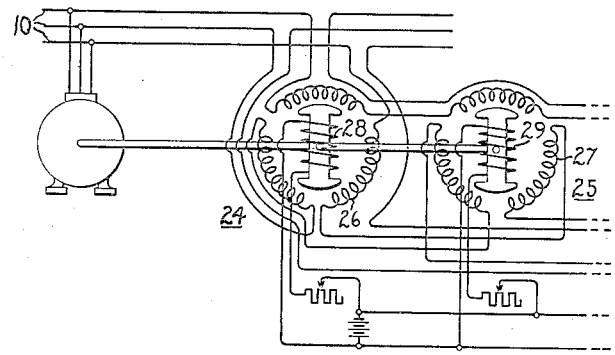
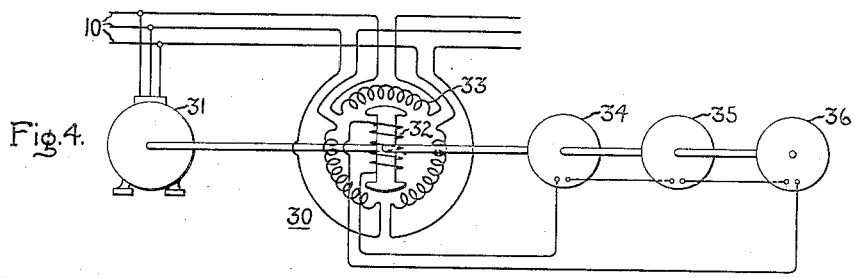
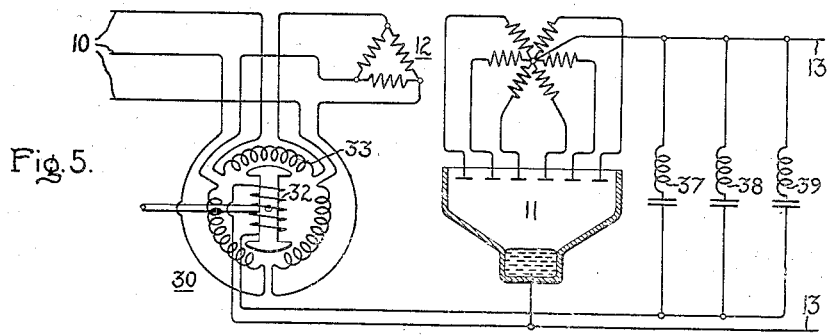
Inventor:
James J. Smith,
by Charles E. Mullen
His Attorney.

Patented July 16, 1935

2,008,519

UNITED STATES PATENT OFFICE 2,008,519

HARMONIC SUPPRESSION MEANS FOR SPACE DISCHARGE APPARATUS CIRCUITS

James J. Smith, Schenectady, N. Y., assignor to General Electric Company, a corporation of New York Application October 12, 1932, Serial No. 637,470

17 Claims. (Cl. 175—363)

My invention relates to electric systems wherein power is transferred between alternating and direct current circuits by means of space discharge apparatus such as a mercury arc rectifier or inverter connected to an alternating current circuit through a transformer, and has for its principal object the elimination or the reduction of the higher harmonics on the alternating current side of the space discharge apparatus.

It is well known that when a space discharge apparatus such as a mercury arc rectifier is supplied from a polyphase alternating current system having substantially a sine wave voltage the current taken from the supply system differs from the sine shape. For example, the current taken by a 6-phase rectifier from a 3-phase supply system contains 5th, 7th, 11th, 13th, 17th, 19th, 23rd, 25th, etc. harmonics, and the current taken by a 12-phase rectifier from a 3-phase supply system contains 11th, 13th, 23rd, 25th, etc. harmonics.

It is also well known that the wave shape of the current in the alternating current supply circuit is influenced by the wave shape of the voltage applied to the rectifier. If a change is made in one of the harmonics in the voltage, a change is caused in the corresponding harmonic in the current. Any of the higher harmonics normally present in the current can be reduced any desired amount by superimposing a voltage of the same frequency upon the voltage of the alternating current supply system and properly adjusting the magnitude and phase of the superimposed harmonic voltage.

In accordance with my invention I provide means for superimposing upon the voltage of the alternating current supply system harmonic voltages corresponding to the harmonics which it is desired to eliminate or reduce in the current wave, and for controlling these superimposed voltages in such a manner as to provide for changes in operating conditions. The voltages superimposed upon the sine-wave supply voltage are so phased as to oppose the flow of the corresponding supply current harmonics, and the magnitude of the voltages opposing the flow of these supply current harmonics is such that the latter harmonics are eliminated or are reduced to a predetermined degree. Since the harmonics in the current supplied to the rectifier are thus eliminated or reduced by the voltages independently impressed upon the supply circuit, the distortion of the supply voltage which tends to occur when these harmonic currents are permitted to flow in the impedance of the supply circuit is also eliminated, or reduced to a predetermined degree. To produce the necessary superimposed harmonic voltages I provide a harmonic generator or generators in operative relation with the alternating current supply system and connected thereto at a point adjacent to the supply transformer or transformers of the rectifier.

It is a particular feature of my invention that the aforesaid generator apparatus providing the required harmonic voltages which are superimposed upon the voltage of the alternating current supply circuit is in series relation with this circuit or in series with the primary windings of the supply transformer of the rectifier. I may produce in separate armatures connected in series with the supply system the voltages required to eliminate a plurality of different harmonics in the current, or, by suitable modifications, all of the required harmonic voltages may be produced in the same armature. The different voltages may be controlled individually or in combination and if desired the control of the voltages may be made automatic in response to load or other conditions.

It will be particularly observed, as explained more fully hereinafter, that the superimposed harmonic voltages do not distort the voltage on the alternating current supply line.

My invention will be better understood from the following description when considered in connection with the accompanying drawing and its scope will be pointed out in the appended claims.

Referring to the drawing, Fig. 1 is a diagrammatic representation of an electric system embodying my invention, a harmonic generator having its armature in series with an electric supply line being provided to suppress a harmonic current which it is desired to eliminate; Fig. 2 represents a modification of the system illustrated in Fig. 1, the armature of the generator being connected to the supply line through transformers; Fig. 3 represents a modification similar to that of Fig. 1, a plurality of generators being provided to suppress a plurality of harmonics; and Figs. 4 and 5 represent modifications in which a single generator is provided to suppress a plurality of harmonics.

In Fig. 1, the invention is illustrated as applied to a 6-phase mercury arc rectifier supplied from a 3-phase alternating current system. In this figure the numeral 10 represents a 3-phase alternating current circuit having a substantially sine-wave voltage and arranged to supply a 6-phase rectifier 11 through a transformer 12 from suitable alternating current generating apparatus (not shown), the direct current output circuit of the rectifier being represented by the numeral 13. The current taken from the alternating current supply circuit 10 by the rectifier 11 would normally contain a plurality of higher harmonics as hereinbefore explained, but for simplicity only one of these harmonics, for example, the 5th harmonic, will be discussed in connection with the system illustrated in Fig. 1.

If it is desired to eliminate this 5th harmonic current, in accordance with my invention a 3-phase generator 14 which generates a voltage of the frequency of the 5th harmonic is connected in series with the alternating current circuit 10 and adjacent to transformer 12, the armature windings 15 being each in series with a different one of the phases of circuit 10. The magnitude of the voltage generated by the harmonic generator 14 may be suitably adjusted, for example, by means of a generator field rheostat 16 connected to the field 17 of the generator and to a direct current source 18, and the phase of the generated voltage may also be suitably adjusted, for example, by varying the position of the armature, as by means of a handle 19. By proper adjustment of the magnitude and phase of the voltage generated by the generator 14 the 5th harmonic in the current taken from the alternating current supply circuit 10 can be reduced to a desired minimum value.

The armature of generator 14 may be designed to carry the current supplied to the rectifier 11 from the supply circuit 10 as shown in Fig. 1, or if desired a suitable filter may be provided to bypass the fundamental frequency current.

It will be noted further that the harmonic generator 14 is connected, to supply circuit 10, adjacent to the rectifier transformer 12 and therefore that the 5th harmonic voltage generated in generator 14 does not distort the voltage on this supply circuit and on the generating or other apparatus connected thereto.

As shown in Fig. 2 the harmonic generator 14 may be connected to the alternating current supply line 10 through transformers 20 whose primaries 21 are in series with the phases of the supply line 10 and whose secondaries 22 are in series with the armature winding 15 of the generator 14. Such connection of the harmonic generator apparatus to the alternating current supply circuit through transformers may be used, for example, where it is desired to insulate this generator apparatus from the voltage of the current supply system.

The harmonic generator 14 may be driven in any convenient manner, for example, by a synchronous motor 23 as shown in Fig. 1, for example, operating on the alternating current supply line 10.

The system in accordance with my invention, as above explained in connection with the embodiment shown in Figs. 1 and 2, in which a single harmonic current, the 5th, is eliminated by means of the series connected harmonic generator 14, may be extended to provide for the elimination of a plurality of harmonics. Thus referring first particularly to the modification of the invention illustrated in Fig. 3, a plurality of generators 24, 25—may be provided similar to the harmonic generator 14 of Figs. 1 and 2, each of the generators 24, 25—being designed to produce a different harmonic voltage, these voltages corresponding respectively, for example, to the 5th, 7th, 11th, 13th, etc. harmonics in the current, the corresponding armature windings 26, 27—of the several generators 24, 25—being connected in series with each other and with the corresponding phases of the alternating current supply line 10 and all of the fields 28, 29—being preferably driven from a single motor such as synchronous motor 23 of Fig. 1.

Referring now particularly to Figs. 4 and 5, it has been set forth in connection with the embodiment illustrated in Fig. 3 that in the latter embodiment a separate harmonic generator may be provided for the elimination of each harmonic current of a plurality of harmonic currents. Such plurality of harmonic currents may however be eliminated or reduced by a single harmonic generator connected in series relation with the alternating current supply line 10 instead of the plurality of harmonic generators shown in Fig. 3. When the harmonic currents which it is desired to eliminate or reduce are pairs of odd-number harmonics differing in order by 2, as for example the harmonics in the current wave of a 6-phase rectifier (the 5th, 7th, 11th, 13th, 17th, 19th, 23rd, 25th, etc. as hereinbefore stated) the necessary superimposed harmonic voltages may then be conveniently generated in a single armature by exciting the field, not with direct current as in Figs. 1 to 3, but with single-phase alternating currents of the proper frequencies.

For example, referring first to the modification illustrated in Fig. 4, a generator 30 which may be, in general, similar to the generator 14 in Figs. 1 and 2 is driven by a motor 31 at the speed which would be proper to produce voltage at the line fundamental frequency if the generator field 32 were excited by direct current. The field 32 is however excited by single-phase alternating current instead of direct current, the frequency of this alternating exciting current being, for example, the frequency of the 6th harmonic. It is well known that under this condition two harmonic voltages, one at the frequency of the 5th harmonic and the other at the frequency of the 7th harmonic, are generated in the armature 32. By proper adjustment of the 5th and 7th harmonic voltages produced in the generator 30, the 5th and 7th harmonics in the current taken from the alternating current supply line 10 may be reduced.

Further the field 32 of the generator 30 may be excited with alternating currents of several different frequencies simultaneously to produce several pairs of harmonic voltages in the armature 33. For example by supplying 6th, 12th and 18th harmonic currents to the field 32 of generator 30, voltages at the frequencies of the 5th, 7th, 11th, 13th, 17th and 19th harmonics are generated in the armature 33 of generator 30. The alternating currents for exciting the field of the generator 30 may be obtained by any suitable means. For example in the embodiment illustrated in Fig. 4, these exciting currents may be obtained from alternators 34, 35 and 36 supplying respectively 6th, 12th and 18th harmonic currents to the field 32 of generator 30. The generators 30, 34, 35, 36 may all be driven by the synchronous motor 31, similar to motor 23 of Fig. 1, operating on the alternating current supply circuit 10.

Instead of obtaining the exciting currents for field 32 from alternators such as 34, 35, 36 the currents may be obtained from other types of well known frequency converters operating on the circuit 10.

Referring more particularly to Fig. 5, if desired the alternating exciting currents for the field 32 of harmonic generator 30 may be obtained from the harmonic voltages which exist on the direct current side of the rectifier 11, in direct current circuit 13, by means of a plurality of suitable filters 37, 38, 39 designed for example to pass respectively the 6th, 12th and 18th harmonics existing in this direct current circuit.

It will be noted that, by the use of filters on the direct current side of the rectifier, as illustrated in Fig. 5, to supply the exciting currents to the field of the harmonic generator 30, advantage may be taken of the variation of the harmonics in the direct current circuit 13 with variation of load to regulate the harmonic voltages produced by the generator 30. It will be noted, further, that the filter circuits utilized to supply exciting currents to the harmonic generator field 32 may be, if desired, combined with filters used on the direct current side of the rectifier 11 for other purposes such for example as for reducing the amplitude of the harmonics present in the direct current circuit 13.

My invention has been described and illustrated herein as applied to a particular space discharge apparatus circuit. It will be understood, however, that the described method of and means for suppressing the higher harmonics in the current in the alternating current circuit to which the space discharge apparatus is connected, and the various modifications of the method and means, are applicable to other circuits, such as single-phase, 6-phase and 12-phase space discharge apparatus circuits having various transformer connection arrangements, wherein power is transferred from an alternating current circuit to a direct current circuit or from a direct current circuit to an alternating current circuit.

What I claim as new and desire to secure by Letters Patent of the United States is:

1. In an electric system comprising a space discharge apparatus and an alternating current circuit having a substantially sine-wave voltage impressed thereon, the current supplied to said discharge apparatus containing a harmonic of said current tending to distort said sine-wave voltage when permitted to flow in the impedance of said circuit, means to prevent said distortion of the sine-wave voltage including a harmonic generator connected in series with said circuit to impress thereon a harmonic voltage of the same frequency as that of said supply current harmonic, said harmonic voltage being so phased as to oppose the flow of said supply current harmonic and of such magnitude as substantially to eliminate said supply current harmonic.

2. In an electric system comprising a space discharge apparatus, an alternating current circuit having a substantially sine-wave voltage impressed thereon, and a transformer connected to said discharge apparatus and having a primary included in said circuit, the current supplied to said discharge apparatus containing a harmonic tending to distort said sine-wave voltage when permitted to flow in the impedance of said circuit, means to prevent said distortion of the sine-wave voltage including an auxiliary harmonic generator connected in series with said circuit to impress thereon a harmonic voltage of the same frequency as that of said supply current harmonic, said harmonic voltage being so phased as to oppose the flow of said supply current harmonic and of such magnitude as to reduce substantially said supply current harmonic.

3. In an electric system comprising a space discharge apparatus, an alternating current circuit having a substantially sine-wave voltage impressed thereon, and a transformer interposed between said discharge apparatus and said circuit, the current supplied to said discharge apparatus containing a plurality of harmonics tending to distort said sine-wave voltage when permitted to flow in the impedance of said circuit, means to prevent said distortion of the sine-wave voltage including an auxiliary generator having an armature connected in series with said circuit to impress thereon a harmonic voltage of the same frequency as that of said supply current harmonic, said harmonic voltage being so phased as to oppose the flow of said supply current harmonic and of such magnitude as to reduce said supply current harmonic to a predetermined degree.

4. In an electric system comprising a space discharge apparatus, an alternating current circuit having a substantially sine-wave voltage impressed thereon and a transformer connected to said discharge apparatus and having a primary included in said circuit, the current supplied to said discharge apparatus containing a plurality of harmonics tending to distort said sine-wave voltage when permitted to flow in the impedance of said circuit, means to prevent said distortion of the since wave voltage comprising harmonic generating means including a plurality of auxiliary harmonic generators connected in series with said circuit, each of said generators impressing upon said circuit a different one of a plurality of harmonic voltages corresponding respectively to different ones of said plurality of distorting harmonics.

5. In an electric system comprising a space discharge apparatus, an alternating current circuit having a substantially sine-wave voltage impressed thereon, and a transformer interposed between said discharge apparatus and said circuit, the current supplied to said discharge apparatus containing a plurality of harmonics tending to distort said sine-wave voltage when permitted to flow in the impedance of said circuit, means to prevent said distortion of the sine-wave voltage comprising harmonic generating means including a plurality of auxiliary harmonic generators each having an armature, the armatures of said generators being connected in series with each other and in series with said circuit, each of said generators impressing upon said circuit a different harmonic voltage of a plurality of harmonic voltages corresponding respectively to different ones of said distorting harmonics.

6. In an electric system comprising a space discharge apparatus, an alternating current circuit and a transformer interposed between said discharge apparatus and said circuit, means to impress upon said circuit a plurality of harmonic voltages corresponding to a plurality of harmonics in the current in said alternating current circuit, said means including a harmonic generator having an armature and a field, said armature being connected in series with said circuit, and means to excite said field with a plurality of alternating currents of predetermined magnitude, frequency and phase.

7. In an electric system comprising a space discharge apparatus, an alternating current circuit, and a transformer interposed between said discharge apparatus and said circuit, means to impress upon said circuit a plurality of harmonic voltages corresponding to a plurality of harmonics in the current in said alternating current circuit, said means including an auxiliary generator having an armature and a field, said armature being connected in series with said circuit, and a plurality of alternating current generators to supply to said field a plurality of exciting currents each operating to induce in said armature a different pair of said corresponding harmonic voltages.

8. In an electric system comprising a space discharge apparatus, a direct current circuit connected to said discharge apparatus, an alternating current circuit having a substantially sine-wave voltage impressed thereon, and a transformer interposed between said discharge apparatus and said alternating current circuit, the current supplied to said discharge apparatus containing a plurality of harmonics tending to distort said sine-wave voltage when permitted to flow in the impedance of said alternating current circuit, means to prevent said distortion of the sine-wave voltage comprising means to impress upon said alternating current circuit a plurality of harmonic voltages corresponding respectively each to a different one of said distorting harmonics, said last-named means including an auxiliary generator having an armature connected in said alternating current circuit and a field, and means responsive to harmonic voltages in said direct current circuit to supply exciting currents to said field.

9. In an electric system comprising a space discharge apparatus, a direct current circuit connected to said discharge apparatus, an alternating current circuit having a substantially sine-wave voltage impressed thereon, and a transformer interposed between said discharge apparatus and said alternating current circuit, the current supplied to said discharge apparatus containing a plurality of harmonics tending to distort said sine-wave voltage when permitted to flow in the impedance of said alternating current circuit, means to prevent said distortion of the sine-wave voltage comprising means to impress upon said alternating current circuit a plurality of harmonic voltages corresponding respectively each to a different one of said distorting harmonics, said last-named means including an auxiliary generator having an armature and a field, said armature being connected in series with said alternating current circuit, and means responsive to harmonic voltages in said direct current circuit to supply exciting currents to said field.

10. In an electric system comprising a space discharge apparatus, a direct current circuit connected to said discharge apparatus, an alternating current circuit, and a transformer interposed between said discharge apparatus and said alternating current circuit, means to impress upon said alternating current circuit a plurality of harmonic voltages corresponding to a plurality of harmonics in the current in said alternating current circuit, said means including an auxiliary generator having a field, a plurality of filters each responsive to a different one of a plurality of harmonic voltages present in said direct current circuit, each of said last-named harmonic voltages corresponding to a different pair of said first-named harmonic voltages, and means to supply exciting currents from said filters to said field.

11. In an electric system comprising a space discharge apparatus, a direct current circuit connected to said discharge apparatus, an alternating current circuit, and a transformer interposed between said discharge apparatus and said alternating current circuit, means to impress upon said alternating current circuit a plurality of harmonic voltages corresponding to a plurality of harmonics in the current in said alternating current circuit, said means including an auxiliary generator having an armature and a field, said armature being connected in series with said alternating current circuit, a plurality of filters each responsive to a different one of a plurality of harmonic voltages present in said direct current circuit, each of said last-named harmonic voltages corresponding to a different pair of said first-named harmonic voltages, and means to supply exciting currents from said filters to said field.

12. In an electric system comprising a space discharge apparatus and an alternating current circuit having a substantially sine-wave voltage impressed thereon connected thereto, the current supplied to said discharge apparatus containing a harmonic tending to distort said sine-wave voltage when permitted to flow in the impedance of said circuit, means to prevent distortion of the sine-wave voltage including a plurality of transformers each having one of its windings in series with a different phase of said circuit and a harmonic generator inductively connected with said circuit through said transformers to impress upon said circuit a harmonic voltage of the same frequency as that of said supply current harmonic, said harmonic voltage being so phased as to oppose the flow of said supply current harmonic and of such magnitude as to reduce substantially said supply current harmonic.

13. In an electric system comprising a space discharge apparatus, an alternating current circuit having a substantially sine-wave voltage impressed thereon, and a transformer interposed between said discharge apparatus and said circuit, the current supplied to said discharge apparatus containing a harmonic tending to distort said sine-wave voltage when permitted to flow in the impedance of said circuit, means to prevent said distortion of the sine-wave voltage including a plurality of transformers each having one of its windings in series with a different phase of said circuit and an auxiliary generator having an armature inductively connected with said circuit through said plurality of transformers to impress upon said circuit a harmonic voltage of the same frequency as that of said supply current harmonic, said harmonic voltage being so phased as to oppose the flow of said supply current harmonic and of such magnitude as to reduce said supply current harmonic to a predetermined degree.

14. In an electric system comprising a space discharge apparatus, a polyphase alternating current circuit having a substantially sine-wave voltage impressed thereon, and a transformer interposed between said discharge apparatus and said circuit, the current supplied to said discharge apparatus containing a plurality of harmonics tending to distort said sine-wave voltage when permitted to flow in the impedance of said circuit, means to prevent said distortion of the sine-wave voltage comprising harmonic generating means including a plurality of polyphase auxiliary harmonic generators each having an armature, the armatures of said generators being connected in series with each other and in series with said circuit, each of said auxiliary generators impressing upon said circuit a different harmonic voltage of a plurality of harmonic voltages corresponding respectively to said distorting harmonics.

15. In an electric system comprising a space discharge apparatus, an alternating current circuit, and a transformer interposed between said discharge apparatus and said circuit, a plurality of transformers each having one of its windings in series with a different phase of said circuit, means to impress upon said circuit a plurality of harmonic voltages corresponding to a plurality of harmonics in the current in said alternating current circuit, said means including a harmonic generator having an armature and a field, said armature being connected inductively with said circuit through said plurality of transformers, and means to excite said field with a plurality of alternating currents of predetermined magnitude, frequency and phase.

16. In an electric system comprising a space discharge apparatus, a direct current circuit connected to said discharge apparatus, an alternating current circuit having a substantially sine-wave voltage impressed thereon, and a transformer interposed between said discharge apparatus and said alternating current circuit, the current supplied to said discharge apparatus containing a plurality of harmonics tending to distort said sine-wave voltage when permitted to flow in the impedance of said alternating current circuit, means to prevent said distortion of the sine-wave voltage comprising a plurality of transformers each having one of its windings in series with a different phase of said alternating current circuit, means to impress upon said alternating current circuit a plurality of harmonic voltages each corresponding to a different one of said distorting harmonics, said last-named means including an auxiliary generator having an armature and a field, said armature being inductively connected with said alternating current circuit through said plurality of transformers, and means responsive to harmonic voltages in said direct current circuit to supply exciting currents to said field.

17. In an electric system comprising a space discharge apparatus, a direct current circuit connected to said discharge apparatus, an alternating current circuit, and a transformer interposed between said discharge apparatus and said alternating current circuit, a plurality of transformers each having one of its windings in series with a different phase of said alternating current circuit, means to impress upon said alternating current circuit a plurality of harmonic voltages, said means including an auxiliary generator having an armature and a field, said armature being inductively connected with said alternating current circuit through said plurality of transformers, a plurality of filters each responsive to a different one of a plurality of harmonic voltages present in said direct current circuit, each of said last-named harmonic voltages corresponding to a different pair of said first-named harmonic voltages, and means to supply exciting currents from said filters to said field.

JAMES J. SMITH.